Dec. 30, 1924.
C. SCRABIC
TRACTOR
1,520,912
Filed Oct. 23, 1922    3 Sheets-Sheet 1
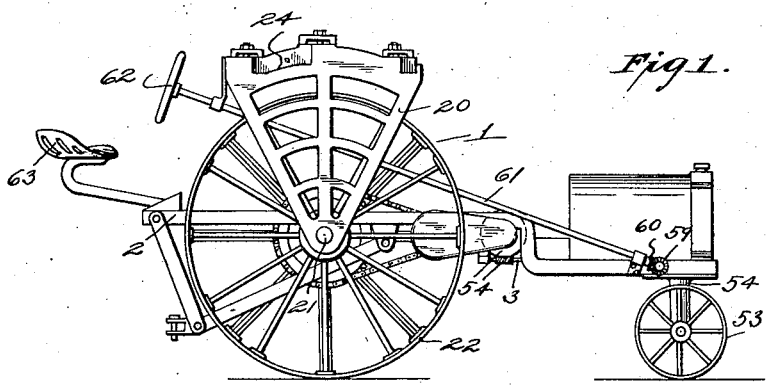
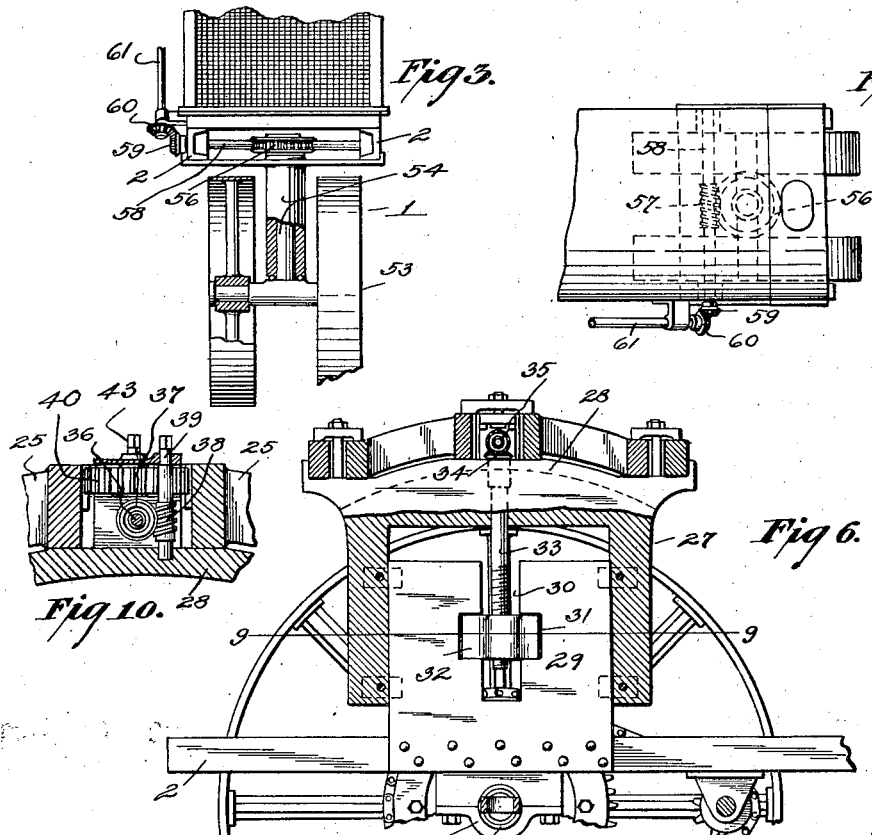

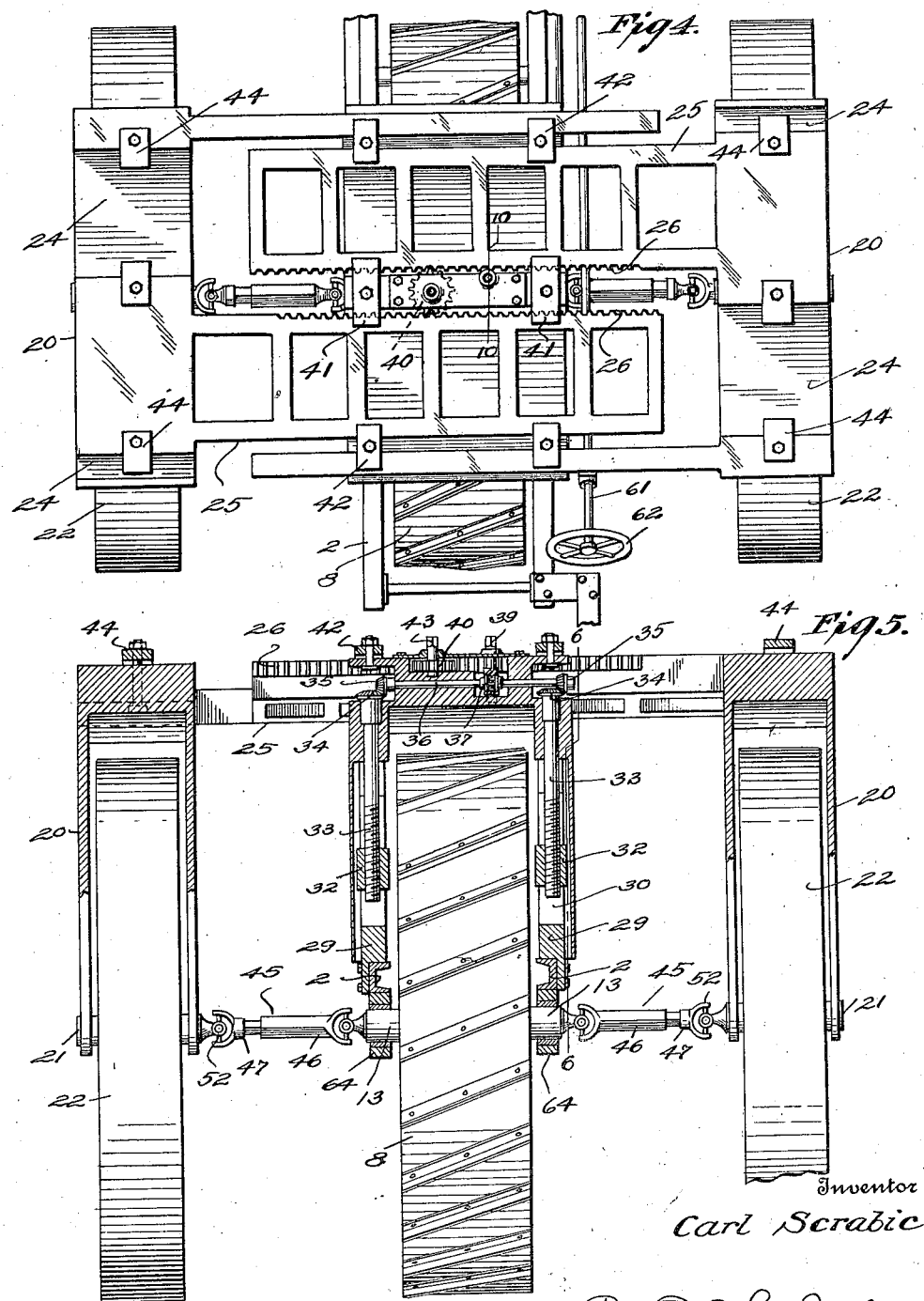

Dec. 30, 1924. 1,520,912
C. SCRABIC
TRACTOR
Filed Oct. 23, 1922 3 Sheets-Sheet 3
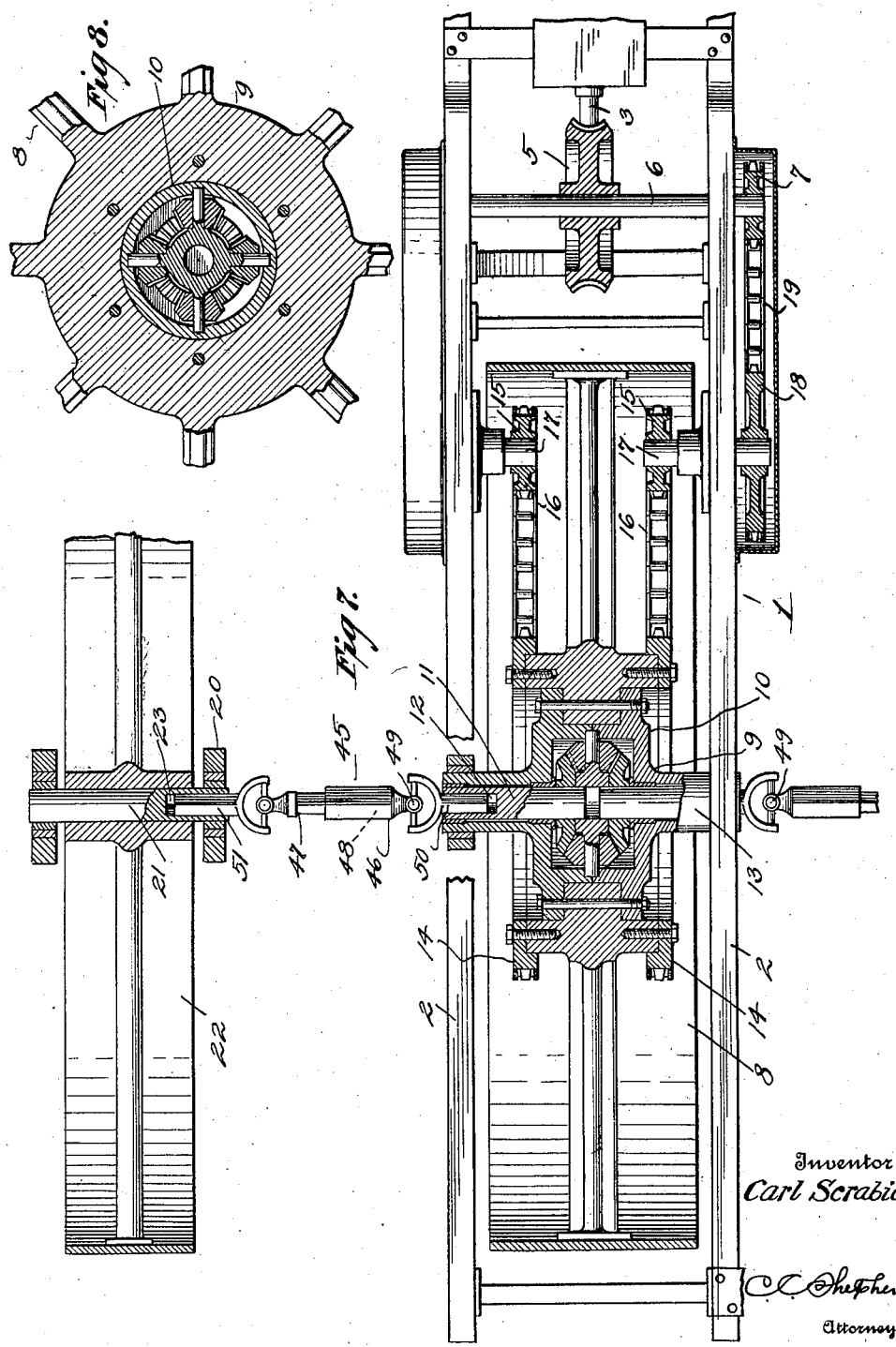
Inventor
Carl Scrabic Patented Dec. 30, 1924.

1,520,912

UNITED STATES PATENT OFFICE.

CARL SCRABIC, OF URBANA, OHIO.

TRACTOR.

Application filed October 23, 1922. Serial No. 596,320.

*To all whom it may concern:*

Be it known that I, CARL SCRABIC, a citizen of the United States, residing at Urbana, in the county of Champaign and State of Ohio, have invented certain new and useful Improvements in Tractors, of which the following is a specification.

The present invention is directed to improvements in tractors.

The primary object of the invention is to provide a tractor wherein its frame is adjustable laterally so as to permit the tractor to pass between rows of plants of varying distances apart.

Another object of the invention is to provide a tractor including a main central driving wheel and supplemental side traction wheels, the wheels being so mounted that the main wheel can be elevated to permit the tractor to be propelled and supported by the supplemental wheels, whereby the cleats of the main drive wheel will be held in such position as to prevent injury to a roadway when the tractor is being moved from field to field.

A still further object of the invention is to provide means whereby the supplemental wheels may be elevated and held out of contact with the ground to permit the same to be adjusted laterally and simultaneously with the frames.

With these and other objects in view, as will appear as the description proceeds, the invention consists in the novel features of construction, combinations of elements and arrangements of parts, and hereinafter to be fully described and pointed out in the appended claims.

In the accompanying drawing:

Figure 1 is a side elevation of the device,

Figure 2 is a fragmentary top plan view,

Figure 3 is a front elevation,

Figure 4 is an enlarged fragmentary top plan view of the frame adjusting mechanism, Figure 5 is a transverse sectional view therethrough, Figure 6 is a sectional view on the line 6—6 of Figure 5, Figure 7 is a longitudinal sectional view through the driving mechanism, Figure 8 is a detail longitudinal sectional view through the differential gearing, Figure 9 is a sectional view on the line 9—9 of Figure 6, Figure 10 is a sectional view on the line 10—10 of Figure 4.

Referring to the drawings 1 designates a tractor, the frame of which includes spaced side sills 2. The engine shaft 3 is provided with a worm 4 which meshes with the worm wheel 5, said wheel being keyed to the shaft 6 journaled transversely of the frame. Each end of the shaft 6 has fixed thereto sprockets 7, the purpose of which will appear later.

The main drive wheel 8 has located in its hub 9 a differential gearing 10, the shafts 11 thereof being provided with squared sockets 12, said shafts being journaled in the sleeves 13. The hub 9 also has associated therewith sprockets 14, one on each side of the hub structure, and trained around these sprockets and the sprockets 15 are chains 16, the sprockets 15 being fixed to the inner ends of the shafts 17 which are journaled in the sills 2, as clearly shown in Figure 7 of the drawings. To the outer ends of the shafts 17 are fixed sprockets 18 which are aligned with the sprockets 7, and trained around the sprockets 7 and 18 are chains 19. Thus it will be seen that when rotary movement is imparted to the shaft 6 that similar movement will be imparted to the wheel 8 through the medium of the sprockets 7, chains 19, sprockets 18 and 15, and chains 16 and sprockets 14.

Upon opposite sides of the wheel 8 are located frames 20 which are substantially triangular in shape, said frames having axles 21 journaled in their minor ends, and fixed to said axles are the supplemental drive wheels 22. The axles 21 are provided with squared sockets 23, the purpose of which will later appear. The upper ends of the frames 20 are provided with diagonally disposed recesses 24, and are further provided with oppositely directed horizontal skeleton arms 25, the confronting sides of which are formed with rack teeth 26. These arms are slidable transversely in a manner to be hereinafter described.

Vertical frames 27 are provided and have their upper ends rigidly connected with a horizontal head 28. Associated with the frames 27 are plates 29 which have their lower ends fixed to the side sills 2, said plates having vertical slots 30 formed therein, the side walls of which are provided with oppositely opposed pockets 31 for supporting the blocks 32, said blocks having engaged therein the threaded shafts 33. The upper ends of these shafts are journaled in the frames 27 and are provided with beveled gears 34 which mesh with the similar gears 35 carried by the ends of the horizontal shaft 36 which is journaled in the head 28. The shaft 36 has a worm gear 37 formed thereon with which meshes the worm 38 carried by the lower end of the shaft 39. It will be of course obvious that upon rotating the shaft 39 that the shaft 36 will be rotated, thus rotating the shafts 33 to raise or lower the head 28, and thus the skeleton arms 25 and wheels supporting frames 20.

Also supported by the head 28 is a pinion 40 which meshes with the rack teeth 26 of the arms 25, this pinion when rotated serving to draw the arms 25 toward or away from each other according to the direction of rotation of said pinion.

As shown in Figure 4 the arms 25 and frames 20 are in one of their adjusted positions, and as shown are adjusted for comparatively wide rows of plants, and at which time the clamps 41 and 42 are in their clamped positions, thus holding the arms 25 against accidental movement. When comparatively narrow rows of plants are being cultivated the pinion 40 is rotated, through the medium of the shaft 43, in a direction to cause the arms to move inwardly until the ends thereof have entered the respective recesses 24, after which the clamps 44 are tightened.

In order to drive the wheels 22 from the wheel 8, couplings 45 are provided, said couplings consisting of sections 46 and 47, the former having squared sockets 48 for telescopically receiving the squared sections 47. The sections 46 are connected by universal joints 49 to the square shafts 50 which are detachably engaged in the sockets 12 of the shafts 11. Detachably engaged in the sockets 23 of the axles 21 are the squared shafts 51 which are connected with the sections 47 of the couplings by universal joints 52. Thus it will be seen that when the main drive wheel 8 is being driven that the wheels 22 will likewise be driven, and should the wheel 8 be in a raised position, rotary movement therefrom will be transmitted through the couplings to the wheels 22, thereby permitting the tractor to be propelled but at which time the wheel 8 will be sufficiently elevated to prevent the cleats thereof from injuring the roadway. The couplings 25, with their universal formation, readily permits the respective wheels 22 to be driven when the wheel 8 is elevated, and the tractor guided owing to the presence of the differential gearing 10.

When the tractor is being used for drawing a gang plow or the like, a considerable traction is necessary, the wheels 22 and 8 will be driven simultaneously and will have their treads engaged with the ground, but when it is desired to propel the tractor over a roadway without injury thereto the wheel 8 is elevated so that its cleats will not contact with the road bed.

To accomplish this it is only necessary to rotate the shaft 36 in a direction to rotate the shafts 33 to the right, thereby causing the blocks 32 to move upwardly and simultaneously therewith the plates 29, and when the wheel 8 is out of contact with the ground power therefrom will be transmitted to the wheels 22 through the couplings 45.

When it is desired to adjust the arms 25 laterally it is only necessary that the wheels 22 be raised from contact with the ground to permit the same to move laterally, and at which time the wheel 8 will sustain the weight. After the wheels 22 have been raised the pinion 40 is rotated in the desired direction to cause the arms 25 to slide in the direction desired, whereupon the wheels 22 can be moved to positions to suit the distance between the growing plants. After this adjustment has been made the wheels 22 are lowered and the arms 25 clamped in their adjusted positions.

In order to raise the wheels 22 the shafts 33 are rotated to the left thereby causing said shaft to move upwardly thus causing the head 28 to move correspondingly, which action lifts the arms 25 and frames 20, and consequently the wheels 22.

It will be of course understood that when the tractor is used for drawing a cultivator for cultivating comparatively tall plants, or plants of such height as to reach the couplings 45, such couplings can be readily removed owing to their telescopic connection with their respective shafts 11 and axles 21.

The front of the tractor frame is supported by a truck which has pivoted thereto through the medium of the spindle 54 a pair of supporting wheels 53. The upper end of the spindle has a worm gear 56 fixed thereto and with which meshes a worm 57 on the shaft 58, said shaft having a beveled gear 59 fixed to one end thereof. Meshing with this pinion is a beveled gear 60 fixed to the forward end of the steering rod 61, said rod being rotated by a steering wheel 62 positioned in convenient reach of the occupant of the seat 63.

The sleeves 13 in which the shafts 11 operate are journaled in suitably mounted bearing boxes 64 associated with the side sills 2 of the frame.

What is claimed is:

1. A tractor comprising a frame, a main driving wheel and supplemental driving wheels associated with the frame, and means for moving laterally the supplemental wheels toward or away from the main driving wheel.

2. A tractor comprising a frame, a main driving wheel and supplemental driving wheels associated with the frame, means for vertically adjusting the main driving wheel, and means for vertically adjusting the supplemental driving wheel independently of the main driving wheel.

3. A tractor comprising a frame, a main driving wheel and supplemental driving wheels associated with the frame, means for driving the main wheel, and means adjustably connecting the main wheel and supplemental wheels for driving the latter.

4. A tractor comprising a frame, a main driving wheel and supplemental driving wheels associated with the frame, means for driving the main wheel, means for raising the main wheel, and laterally adjustable means connecting the main wheel and supplemental wheels to drive the latter when the main wheel is in its raised position.

5. A tractor comprising a frame, a main driving wheel and supplemental driving wheels associated therewith, means for raising the supplemental wheels vertically, and means for moving the supplemental wheels toward or away from the main wheel when the latter wheels are in their raised position.

6. A tractor comprising a frame, a main driving wheel and supplemental driving wheels associated with the frame, means for driving the main and supplemental wheels simultaneously, and means for adjusting laterally the supplemental wheels toward or away from the main driving wheel.

7. A tractor comprising a frame, a main driving wheel and supplemental driving wheels associated with the frame, differential shafts carried by the main wheel, telescoping coupling members connecting said shafts and supplemental wheels to drive the latter, and means for driving said main wheel.

8. A tractor comprising a main frame, a main driving wheel associated with the frame, a head, supplemental frames slidably and adjustably connected with the head, supplemental driving wheels carried by the supplemental frames, means carried by the main wheel and supplemental wheels for driving the latter from the main wheel, and means for adjusting the supplemental frames and wheels laterally.

9. A tractor comprising a main frame, a main driving wheel associated therewith, a supplemental driving wheel disposed upon each side of the main driving wheel, means for raising the main driving wheel from contact with the ground, and adjustable driving connections between the supplemental wheels and main driving wheel to drive the car when the latter is in its raised position.

10. A tractor comprising a main frame, a main driving wheel associated therewith, arms connected with the main frame, supplemental driving wheels associated with the arms, means for moving the arms laterally and thus the supplemental driving wheels toward or away from the main driving wheel, means for selectively raising either the main driving wheel or supplemental driving wheels, and adjustable driving connections between the main driving wheel and supplemental driving wheels to drive the latter when the car is in its raised position.

In testimony whereof I affix my signature.

CARL SCRABIC.